United States Patent [19]

Sato et al.

[11] 3,744,906
[45] July 10, 1973

[54] DEVICE FOR DETERMINING THE DISTANCE OF AN OBJECT FROM AN ENDOSCOPE AND DEVICE THEREFOR

[75] Inventors: Masaaki Sato; Shoichi Saito; Shinya Kosaka, all of Tokyo, Japan

[73] Assignee: Olympus Optical Company Ltd., Tokyo, Japan

[22] Filed: Apr. 6, 1970

[21] Appl. No.: 31,060

Related U.S. Application Data

[62] Division of Ser. No. 747,224, July 24, 1968, Pat. No. 3,608,547.

[30] Foreign Application Priority Data

July 29, 1967   Japan................................ 42/48686
Dec. 19, 1967  Japan................................ 42/81328

[52] U.S. Cl.......................... 356/4, 356/3, 250/205, 128/6, 95/11 HC
[51] Int. Cl............................................. G01c 3/08
[58] Field of Search.................. 95/11 HC; 250/205; 356/3, 4; 128/6

[56] References Cited
UNITED STATES PATENTS

| | | | |
|---|---|---|---|
| 3,329,074 | 7/1967 | Gosselin............................ | 95/11 HC |
| 3,350,604 | 10/1967 | Erickson............................ | 250/205 |
| 3,123,724 | 3/1964 | Schrenk et al...................... | 250/205 |
| 3,076,378 | 2/1963 | Biedermann et al................ | 250/205 |
| 3,583,299 | 6/1971 | Land................................. | 250/205 |

Primary Examiner—Benjamin A. Borchelt
Assistant Examiner—S. C. Buczinski
Attorney—Kurt Kelman

[57] ABSTRACT

Method for determining the distance of an object from an endoscope which comprises the steps of emitting a light of predetermined intensity and receiving the light reflected from the object having substantially the same reflecting power over the entire area thereof by a photoelectric element, the intensity of the reflected light being the function of the distance from the object, the photo-electric element produces an electrical signal corresponding to the distance. The signal thus produced is recorded and compared with a previously prepared chart indicating the relation between the signal and the distance so that the distance is determined after the operation of the endoscope is completed.

The spectroscopic characteristics of the light used for determining the distance is so selected that the film contained in the endoscope for photographing the object is not affected by the light used for determining the distance so that the determination of the distance can be made during the operation of the endoscope.

The intensity of the light used for determining the distance is made variable for the better observation of the object while the output of the photoelectric element is varied in inverse proportion to the variation in the intensity of the light so that the correct determination of the distance can be made even though the intensity of the light source is varied.

The devices for carrying out each of the above method.

10 Claims, 8 Drawing Figures

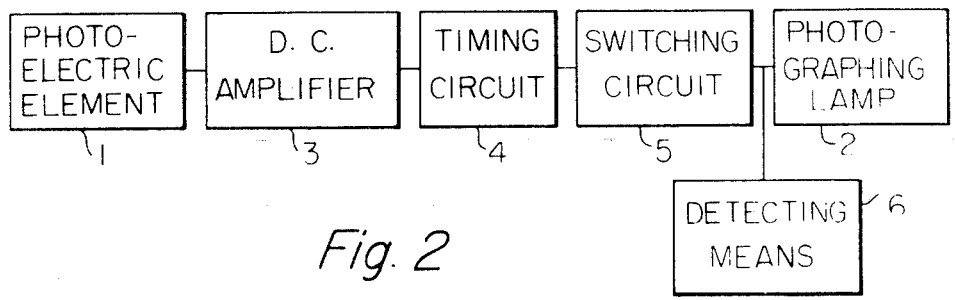
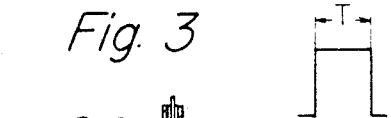
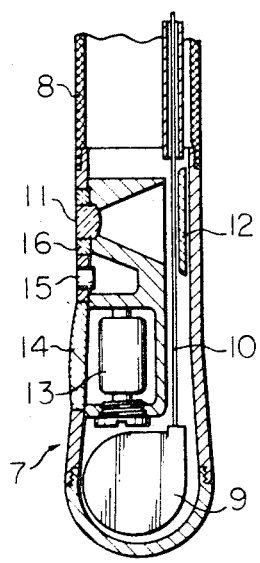
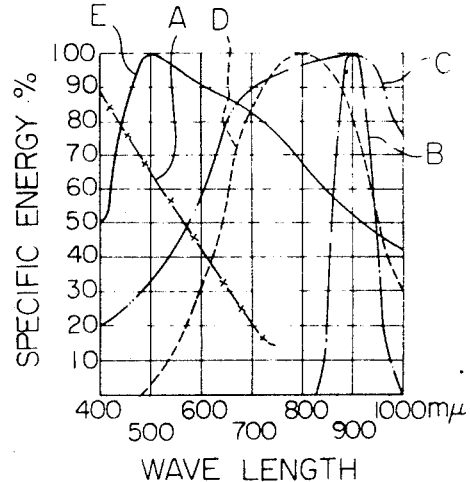
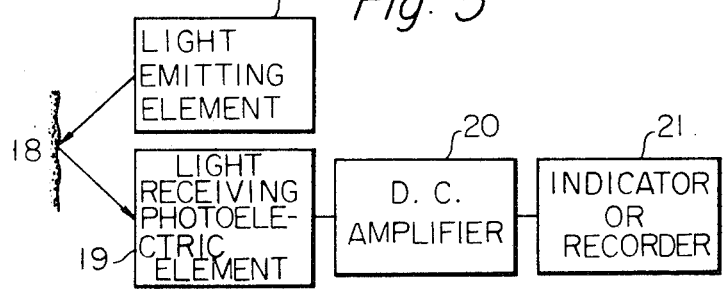

3,744,906

DEVICE FOR DETERMINING THE DISTANCE OF AN OBJECT FROM AN ENDOSCOPE AND DEVICE THEREFOR

REFERENCE TO COPENDING APPLICATION

The present application is a divisional of my copending application Ser. No. 747,224, filed July 24, 1968, now U.S. Pat. No. 3,608,547.

BACKGROUND OF THE INVENTION

The present invention relates to a device for determining the distance of the object to be photographed or observed by an endoscope and a device therefore.

Heretofore, the distance of the object photographed on a film by an endoscope can only be assumed after the operation has been completed by comparing the portion on the film which is to be investigated with the remaining portion on the film or by relying on the memory of the operator obtained during the operation of the endoscope.

However, it is very difficult to exactly determine the distance of the object photographed or observed by an endoscope.

The present invention provides a novel and useful method and device for exactly determine the distance of the object to be photographed or observed by an endoscope not only after the operation has been completed but also during the operation is being carried out.

SUMMARY OF THE INVENTION

The present invention utilizes the fact that the reflecting power of the object such as the inner wall of a hollow portion of a living body is substantially the same over the entire area thereof. When a light of a predetermined intensity or total quantity is directed to an object having the same reflecting power from the endoscope and the light is reflected from the object and received by the endoscope, the intensity or the total quantity of the light received by the endoscope is the function of the distance between the object and the endoscope. Therefore, when the light reflected from the object is received by a photoelectric element provided in the endoscope, the photoelectric element generates an electric signal corresponding to the intensity or the total quantity of the light received thereby which is in turn the function of the distance of the object. By using the thus generated electrical signal which has been recorded during the operation, the distance can be determined after the operation of the endoscope is completed.

In accordance with another feature of the present invention, a light source having the spectroscopic characteristics such as those of near infrared ray which do not affect the film contained in the endoscope for the photographing of the object is provided, so that the determination of the distance of the object can be effected during the operation of the endoscope by utilizing the reflected light, while the object can be photographed by using another light source provided in the endoscope.

In accordance with further feature of the present invention, the intensity of the light to be used for determining the distance can be varied for the better observation of the object by means of a viewing optical system provided in the endoscope while the correct determination of the distance is achieved by varying the electrical signal generated by the photoelectric element in response to the intensity of the light received thereby in inverse proportion to the variation in the intensity of the light emitted from the endoscope for illuminating the object so as to correctly determine the distance.

Therefore, the object of the invention is to provide a novel and useful device for determining the distance of the object to be photographed or observed by the endoscope.

BRIEF DESCRIPTION OF THE DRAWINGS

FIG. 1 is a block diagram showing the scheme of the present invention;

FIG. 2 shows the exposure time as recorded by the detecting means in FIG. 1;

FIG. 3 is a longitudinal cross-sectional view showing the forward end portion of an embodiment of an endoscope incorporating the device of the present invention;

FIG. 4 shows spectroscopic characteristics of various elements used in the present invention;

FIG. 5 is a block diagram showing the scheme of the operation of the embodiment of FIG. 3.

DETAILED DESCRIPTION OF THE PREFERRED EMBODIMENTS

Figure 6:
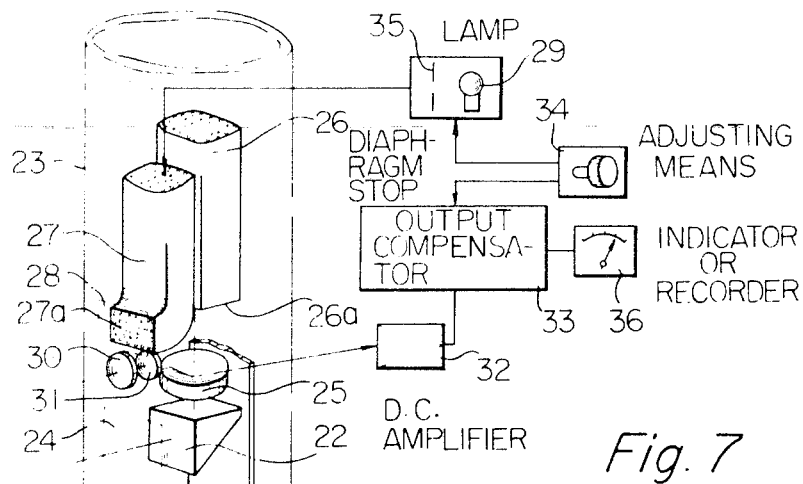
FIG. 6 is a schematic perspective view showing the scheme of the other embodiment of the present invention.

Referring to the drawings, FIG. 1 shows schematically the first embodiment of the present invention which is to be incorporated in an endoscope having a forward end portion housing therein a photographing means and adapted to be inserted into a hollow portion of a living body or the like so as to photograph the interior thereof, and a control housing connected to the forward end portion through an elongated flexible tube. The construction of such an endoscope is well known and, therefore, the detailed description thereof is unnecessary. A photoelectric element 1 is provided in the forward end portion of the endoscope (not shown) at a position adjacent to a photographing lamp 2 for illuminating an object to be photographed with the light receiving surface of the photoelectric element 1 being directed to the object. The photoelectric element 1 is preferably made of a silicone photoelectric element which is compact in size and reliable in performance and is of a quick response character. A D. C. amplifer 3 provided in the control housing or located exterior thereof and connected thereto is connected to the photoelectric element 1 through the elongated flexible tube. A timing circuit 4 connected to the D. C. amplifer 3 is connected to a switching circuit 5 also provided in the control housing or located exterior thereof and connected thereto, to which the photographing lamp 2 is connected through the elongated flexible tube. A detecting means 6 provided in the control housing or located exterior thereof and connected thereto is branched from between the switching circuit 5 and the photographing lamp 2. The timing circuit 4 is so constructed that it produces a timing signal determining the proper exposure time for photographing the object illuminated by the photographing lamp 2 in response to the electrical signal derived from the photoelectric element 1 which receives the light reflected from the object and generates the electrical signal corresponding to the intensity of the light received thereby and amplified by the D. C. amplifier 3. The switching circuit 5 is so constructed that it terminates the energization of the photographing lamp 2 by the timing signal from the timing circuit 4 after the proper exposure time has elapsed. The photographing lamp 2 is determined to emit a light having a predetermined constant intensity during the time it is energized. The detecting means 6 is so constructed that it receives a signal from the switching circuit 5 and records the exposure time of the photographing lamp 2 in the form of pulses in recording means such as a memoryscope, an oscillograph with recording pen, an electromagnetic oscillograph and the like. FIG. 2 shows the thus recorded exposure time T.

In operation, the forward end portion of the endoscope is inserted into a hollow portion in a living body to be inspected, and the photographing lamp 2 is energized by the operation of a control mechanism in the control housing. Since the reflecting power of the inner wall of the hollow portion of a living body to be inspected by the endoscope may be regarded as being substantially the same over the entire area thereof, the intensity or the total quantity of the light emitted from the photographing lamp 2 and reflected from the inner wall of the hollow portion varies substantially depending upon only the distance between the inner wall of the hollow portion and the forward end portion, because the light emitted from the photographing lamp 2 is set to a predetermined constant intensity. Therefore, the photoelectric element 1 generates an electrical signal corresponding to the intensity of the light reflected from the object and received thereby which is in turn the function of the distance between the object and the forward end portion of the endoscope.

The electrical signal thus generated is amplified by the D. C. amplifier 3 and sent to the timing circuit 4 which produces a timing signal indicating the proper exposure time of the object illuminated by the photographing lamp 2 in response to the electrical signal supplied from the D. C. amplifier 3. The timing signal is sent to the switching circuit 5 which is actuated when the endoscope is operated for the photographing of the object so as to keep the switching elements thereof in electrically conductive state so that the photographing lamp 2 continues to be energized, however, the actuation of the switching means 5 is terminated when it receives the timing signal from the timing circuit 4 so that the switching elements are rendered to be electrically non-conductive state thereby deenergizing the photographing lamp 2 after the proper exposure time as set by the timing circuit 4 has elapsed.

The detecting means 6 supplies the record of the exposure time T as previously described.

In determining the distance between the object and the forward end portion of the endoscope, the recorded exposure time T is compared with a chart indicating the relationship between the distance and the proper exposure time which is prepared preliminarily by photographing an object similar to the hollow portion of the living body from various distances and different exposure times under the conditions similar to those in the hollow portion of the living body so that the proper relationship between the distance and the proper exposure time is obtained. The value of the distance corresponding to the value of the exposure time T in the chart indicates the distance between the object and the forward end portion of the endoscope at which the photographing of the object is made.

In the above described embodiment, the photographing lamp is shown as a lamp such as a tungsten type lamp, however, a light conducting fiber optical system extending from the forward end portion through the elongated flexible tube to a position adjacent to the control housing can be used in place of the lamp. In this case, the forward end of the light conducting fiber optical system is positioned in the forward end portion so as to emit the light toward the object, while the rearward end of the light conducting fiber optical system is illuminated by an external light source to thereby transmit the light through the light conducting fiber optical system to the forward end thereof so as to be emitted therefrom. With such a light conducting fiber optical system, the external light source must be of greater capacity because of the relatively low light conducting efficiency of the light conducting fiber optical system, therefore, it is preferred to provide a shutter means between the rearward end of the light conducting fiber optical system and the external light source which is actuated by means of the control mechanism so as to illuminate the rearward end of the light conducting fiber optical system or intercept the illumination thereof for the proper exposure of the object rather than energizing and deenergizing the external light source in order to avoid the time lag of the external light source until the maximum brightness is achieved from the energizing thereof. To control the shutter means, solenoid means may be conveniently utilized. As to the external light source, an iodine lamp is preferably used, because the variation in the performance of the illumination thereof is very low.

FIGS. 3 to 5 show the second embodiment of the present invention, by which the distanc between the object and the forward end portion of the endoscope during the operation thereof can be determined prior to or during the photographing of the object.

Referring to FIG. 3, the forward end portion 7 is connected to the elongated flexible tube 8 which is in turn connected to a control housing (not shown). A film magazine 9 is housed in the forward end portion 7. A film 10 reeled in the magazine 9 is withdrawn therefrom through the elongated flexible tube by one film frame by means of the control mechanism in the control housing each time the endoscope is operated for the exposure of the object. An objective lens system 11 is provided in the wall of the forward end portion 7 at the side opposite to that along which the film 10 is transported so as to form an image of the object on the film when the operation of the endscope for the exposure is effected.

Pressure plate 12 is located in the forward end portion behind the film 10 in alignment with the objective lens system so as to keep the portion of the film 10 flat.

A lamp 13 is provided in the forward end portion 7 adjacent to the objective lens system 11 for illuminating the object through a window 14 so as to permit the object to be photographed. The lamp 13 is energized by an external electric source through lead wires extending through the elongated flexible tube 8 each time the endoscope is operated for the exposure. The proper exposure time may be set in like manner as described in connection with the first embodiment shown in FIGS. 1 and 2.

The lamp 13 is of a tungsten type, and therefore, the tungsten type color film 10 is used in this endoscope. The spectral sensitivity of the tungesten type color film 10 is indicated by A in FIG. 4. As shown, the sensitivity of the tungsten type color film 10 is higher in the range of shorter wave lengths while the sensitivity decreases relatively steeply toward the range of longer wave lengths. Therefore, the film 10 is not sensitive to the near infrared light ray or to a light having the wave lengths longer than the near infrared light ray.

In accordance with the important feature of the present invention, an illuminating means 15 such as a luminous body emitting a light of longer wave lengths such as near infrared light ray is provided in the wall of the forward end portion 7 adjacent to the objective lens system 11. One example of such a luminous body 15 is a luminous diode made of an arsenic-gallium compound (GaAs). The spectroscopic characteristics of the luminous diode made of the arsenic-gallium compound is indicated by B in FIG. 4. It will be understood from FIG. 4 that the film 10 having the spectral sensitivity as indicated by A is not affected by the light emitting from the luminous diode of the arsenic-gallium compound and having the spectroscopic characteristics as indicated by B.

A photoelectric element 16 such as a silicone photoelectric element or a phototransistor suitable for sensing the light emitted from the luminous diode of the arsenic-gallium compound and generating an electrical signal corresponding to the intensity of the light received by the luminous diode is located adjacent to the objective lens system 11. In FIG. 3, the photoelectric element 16 is shown as surrounding the objective lens system 11. The spectral sensitivity of the silicone photoelectric element is indicated by C in FIG. 4, while that of the phototransistor is indicated by D in FIG. 4. As is clear from FIG. 4, the light emitting from the luminous diode indicated by B in FIG. 4 is efficiently sensed by the silicone photoelectric element and the phototransistor, the spectral sensitivities of which are indicated by B and C in FIG. 4, respectively, while the film having the spectral sensitivity as indicated by A in FIG. 4 is not affected by the light of the luminous diode. For the reference, the spectroscopic characteristics of the light emitted from the sun is indicated by E in FIG. 4.

As previously described, the reflecting power of the inner wall of a hollow portion of a living body into which the forward end portion of the endoscope is to be inserted for the inspection thereof may be regarded as being substantially the same over the entire area thereof, therefore, when the intensity of the light emitted from the luminous body 15 is kept constant, the intensity or the total quantity of the light reflected from the object and received by the photoelectric element 16 varied depending upon the distance between the object and the forward end portion of the endoscope. In other words, the intensity or the total quantity of the light received by the photoelectric element 16 is determined by the distance between the object and the forward end portion of the endoscope.

FIG. 5 is a block diagram showing the scheme of the present invention. A light emitting element 17 such as the luminous body 15 in FIG. 3 emits the light toward an object 18 such as the inner wall of a hollow portion of a living body, and the light reflected from the object 18 is incident to a light receiving photoelectric element 19 such as the photoelectric element 16 in FIG. 3. The light receiving photoelectric element 19 is connected to a D. C. amplifier 20 such as the D. C. amplifier 3 shown in FIG. 1 while the D. C. amplifier 20 is connected to an indicator or recorder 21 such as a Galvanometer or an electromagnetic oscillograph, so that the electrical signal i.e. the output of the light receiving photoelectric element 19 generated by the light incident thereto is amplified by the D. C. amplifier 20, and the amplified electrical signal, i.e. the output is recorded by the indicator or recorder 21. As previously described, the light emitting element 17 emits a light which does not affect the film contained in the forward end portion of the endoscope for photographing the object, so that the operation shown in FIG. 5 does not harm the proper operation for photographing the object.

Therefore, the distance between the object and the forward end portion of the endoscope when it is inserted into the hollow portion of a living body can be determined not only after the exposure of the film has been completed but also during the operation of the endoscope by comparing the indicated and/or recorded output of the photoelectric element as amplified by the D.C. amplifier with a chart indicating the relationship between the distance from the object to the forward end portion of the endoscope and the intensity of the output of the photoelectric element as amplified by the D.C. amplifier in like manner as described with reference to FIGS. 1 and 2.

Alternatively, the graduation in the indicator or recorder 21 can be substituted by a scale indicating the distance by calculating the values of the output in terms of the distance so that the distance can be directly read out from the scale.

In the embodiment as described above, a tungsten type lamp with a red filter can be used in place of the luminous body 15 or 17 although the variation in the performance of the illumination of the object cannot be avoided to a certain extent.

Figure 7:
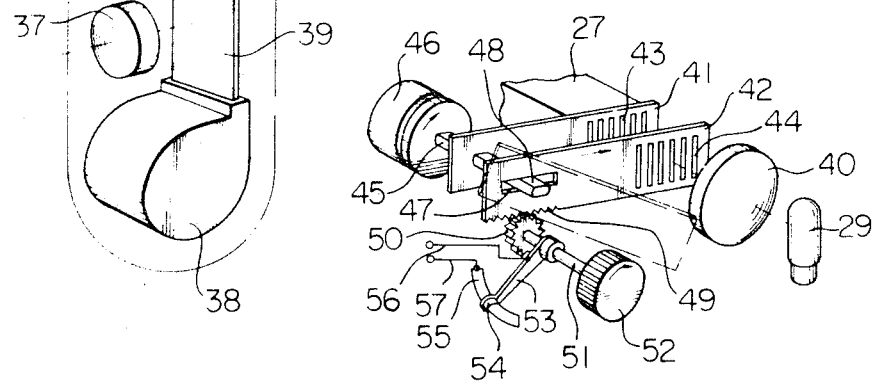
FIG. 7 is a fragmentary perspective view showing one example of the present invention for adjusting the intensity of the light to be emitted from the endoscope for the better observation of the object and for emitting intensive light for photographing the object.
Figure 8:
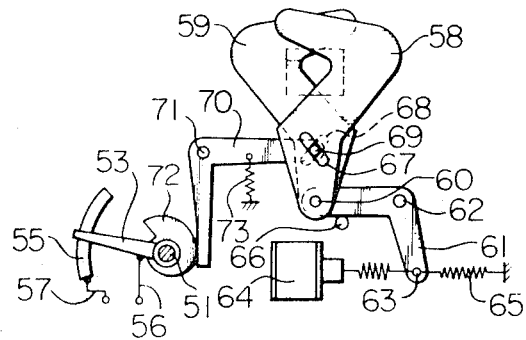
FIG. 8 is a view showing an alternative embodiment of FIG. 7.

FIGS. 6 to 8 show the third embodiment of the present invention which is to be incorporated in an endoscope having a viewing optical system comprising an image transmitting optical system such as a fiber optical system extending through an elongated flexible tube connecting the control housing of the endoscope to the forward end portion adapted to be inserted into a hollow portion of a living body or the like so as to inspect the interior thereof while the forward end portion is inserted into the hollow portion.

As shown in FIG. 6, a reflecting prism 22 is provided in the forward end portion 23 so as to reflect the light from an object and incident thereto through a viewing window 24 provided in the wall of the forward end portion 23 toward an objective lens system 25. The forward end 26a of an image transmitting optical system 26 such as a fiber optical system is located behind the objective lens system 25 so that an image of the object is focused on the forward end 26a of the image transmitting optical system 26. The image transmitting optical system 26 extends through the elongated flexible tube connected at its forward end to the forward end portion 23 and at its rearward end to the control housing (not shown). The rearward end of the image transmitting optical system 26 terminates in the control housing and an ocular means is provided in the control housing behind the rearward end of the image transmitting optical system 26 an appropriate distance spaced therefrom and in alignment therewith so that the image of the object transmitted through the image transmitting optical system 26 to the rearward end thereof is viewed through the ocular means.

A light conducting optical system 27 such as a fiber optical system extends through the elongated flexible tube with the forward end 27a being directed to an illuminating window 28 provided in the wall of the forward end portion 23 so that the light emitted from the forward end 27a of the light conducting optical system illuminates the object through the illuminating window 28. The rearward end of the light conducting optical system 27 terminates at a position in the control housing or exterior thereof extending from the control housing. The rearward end of the light conducting optical system 27 is connected to an illuminating light source 29 such as a lamp so that the light from the light source 29 and received by the rearward end of the light conducting optical system 27 is transmitted therethrough to the forward end 27a thereof thereby permitting the light to be emitted from the forward end 27a so as to illuminate the object. The intensity of the light emitted from the forward end 27a of the light conducting optical system may be set at a predetermined intensity.

A light receiving window 30 comprised of a condenser lens is provided in the wall of the forward end portion 23 adjacent to the illuminating window 28, and a photoelectric element 31 is located in the forward end portion 23 behind the light receiving window 30.

Therefore, the light emitted from the forward end 27a of the light conducting optical system 27 and reflected from the object is received by the photoelectric element 31 through the light receiving window 30 so that the photoelectric element 31 generates an electrical signal corresponding to the intensity of the light received by the photoelectric element 31.

A D. C. amplifier 32 is connected to the photoelectric element 31 so as to amplify the electrical signal supplied from the photoelectric element 31.

An output compensator 33 is connected to the D. C. amplifier 32, and a mechanical adjusting means 34 is operatively connected to the output compensator 33 and diaphragm stop means 35 associated with the illuminating light source 29. An indicator or recorder 36 is connected to the output compensaor 33, so that an electrid signal or pulses supplied from the compensator 33 and corresponding to the electrical signal derived from the photoelectric element 31 is indicated or recorded in the indicator or recorder 36. As described previously, the scale in the indicator or recorder 36 may be graduated in the distance scale by calculating in terms of the distance the electrical signal from the output compensator 33 derived from the electrical signal generated in the photoelectric element 31 in response to the intensity of the light received thereby which is the function of the distance between the object and the forward end portion of the endoscope when the intensity of the illuminating light source 29 is kept constant.

The operation of the output compensator 33 and the adjusting means 34 will be described later.

In operation, the illuminating light source 29 is energized by the operation of a control mechanism in the control housing of the endoscope while the forward end portion is inserted into a hollow portion of a living body or the like to be inspected. The light emitted from the illuminating light source 29 and reflected from the object is received by the photoelectric element 31 through the light receiving window 30 comprised of a condenser lens which serves to direct the light reflected from the center portion of the object to the photoelectric element 31 so as to increase the accuracy of the measurement of the intensity of the light by means of the photoelectric element 31.

As previously described, since the reflecting power of the inner wall of a hollow portion in a living body may be regarded as being the same over the entire area thereof, the intensity or the total quantity of the light received by the photoelectric element 31 is the function of the distance between the object and the forward end portion of the endoscope from which the illuminating light is emitted, if the intensity of the light emitted from the forward end portion is kept constant. The electrical signal generated in the photoelectric element 31 in response to the intensity or the total quantity of the light received thereby is indicated or recorded in the indicator or recorder 36 through the D. C. amplifier 32 and the output compensator 33. Thus, the distance between the object and the forward end portion of the endoscope can be read out from the indication or the record in the indicator or recorder 36 which is the function of the intensity of the light received by the photoelectric element 31 which is in turn the function of the distance between the object and the forward end portion not only after the inspection has been completed but also during the inspection is being carried out.

Now, the operation of the output compensator 33 and the adjusting means 34 will be described. During the inspection of the inner wall of the hollow portion of a living body by means of an observation optical system incorporated in an endoscope as described above, it is aften desired to vary the intensity of the light illuminating the object for the better observation of the object depending upon the distance between the object and the forward end portion of the endoscope from which the illuminating light is emitted. In this case, the intensity or the total quantity of the light received by the photoelectric element 31 is necessarily varied even if the distance is kept constant. On the other hand, the electrical signal derived from the photoelectric element 31 and supplied to the indicator or recorder 36 through the D. C. amplifier 32 and the output compensator 33 must be kept at the same value when the distance between the object and the forward end portion of the endoscope is kept unchanged.

This is achieved by the important feature of the present invention by operatively coupling the output compensator 33 with the adjusting means 34 in such a manner that the output to be supplied to the indicator or recorder 36 from the output compensator 33 is varied in inverse proportion to the variation in the intensity or the total quantity of the light emitting from the illuminating light source 29. Thus, when the diaphragm stop means 35 is adjusted by the manual operation of the adjusting means 34 so as to vary the intensity or the total quantity of the light passing therethrough from the light source 29 to the light conducting fiber optical system 27, the output supplied to the indicator or recorder 36 from the output compensator 33 is varied in inverse proportion to the variation in the intensity or the total quantity of the light emitted from the forward end portion 23, thereby permitting the output from the output compensator 33 to be compensated for the variation in the intensity or the total quantity of the light emitted from the forward end portion 23 so that the indication or the record in the indicator or the recorder 36 indicates correctly the distance betwen the object and the forward end portion of the endoscope even if the intensity or the total quantity of the light emitted from the forward end portion is varied for the better observation of the object.

A lamp can be located in the forward end portion in place of the illuminating optical system as described above. In this case, the intensity of the light is varied by means of the adjusting means 34 which adjusts the input to the lamp, while the output compensator 33 is actuated in like manner described previously.

The endoscope described above may be provided with photographing means comprising an objective lens system 37 located in the forward end portion 23 and a magazine 38 containing reeled coil of film 39 also located in the forward end portion 23. The film 39 is pulled out of the magazine 38 through the elongated flexible tube each time the endoscope is operated for the photographing of the object in like manner as previously described.

In the endoscope having the viewing optical system and the photographing means as described above, the intensity of the light emitted from the forward end portion of the endoscope must be increased for the proper exposure of the film each time the photographing of the object is effected, while the intensity of the light is made variable during the observation of the object for the better observation thereof. The proper exposure time may be set in like manner as described previously. In order to prevent the film 39 from being affected by the light emitted during the observation of the object, a shutter means may be provided in the forward end portion in the optical path of the objective lens system 37 in front of the film 39, which is opened each time the photographing of the object is effected in coupled relation to the increase in the intensity of the light effected by the operation of the control mechanism in the control housing.

One example of the device for adjusting the intensity of the light for the better observation of the object as well as for increasing the intensity of the light for the proper exposure of the film is shown in FIG. 7. In FIG. 7, a condenser lens 40 and a pair of parallely arranged diaphragm plates 41, 42 are interposed between the light source 29 and the rearward end of the light conducting fiber optical system 27. Diaphragm plate 41 is provided with a row of a plurality of elongated slits 43 with the direction thereof substantially normal to the direction of the row while diaphragm plate 42 is provided with the corresponding number and size of slits 44 arranged in the same manner as slits 43 so that the relative movement of the plates 41, 42 in the direction of the row varies the intensity or the total quantity of the light through the slits 43,44. The diaphragm plate 41 is fixedly mounted on the rotatable shaft 45 of a rotary solenoid 46 which is actuated each time the endoscope is operated for the photographing of the object. The diaphragm 42 is provided with an elongated slit 47 in which the portion 48 of the shaft 45 having flattened configuration in cross-section is slidably engaged thereby permitting the plate 42 to be shifted only parallely relative to plate 41 so that the intensity of the light passing through slits 43, 44 in plates 41, 42 is varied depending upon the amount of the relative movement of plates 41, 42. A rack 49 is formed at one side of the diaphragm plate 42. A pinion 50 mounted on one end of shaft 51 having an adjusting knob 52 at its other end engages with the rack 49, so that the plate 42 is shifted relative to the plate 41 by rotating the knob 52. The knob 52 constitutes the adjusting means 34 in FIG. 6. The shaft 51 mounts thereon a contact arm 53 having a contact 54 at its outer end. The contact 54 is adapted to slidably contact with an arcuate resistor 55 constituting the output compensator 33 in FIG. 6. Lead wires 56, 57 are connected at their one ends to the arm 53 and one end of the resistor 55, respectively, while the other ends are connected to the D. C. amplifier 32 and the indicator or recorder 36 in FIG. 6, respectively. Therefore, when the plate 42 is shifted relative to plate 41 by rotating the knob 52 so as to vary the intensity of the light passing through slits 43, 44, the resistance between the D. C. amplifier 32 and the indicator or recorder 36 can be varied in inverse proportion to the variation in the intensity of the light passing through slits 43, 44.

When the endoscope is operated for the photographing of the object, the rotary solenoid 46 is actuated so as to rotate the shaft 45 thereby permitting the diaphragm plates 41, 42 to be moved out of the optical path between the light source 29 and the rearward end of the light conducting fiber optical system 27 so that the intense light can be emitted for the proper photographing of the object.

An alternative example of the device FIG. 7 is shown in FIG. 8. In this example, a pair of oppositely pivotable blades 58, 59 is pivoted on pin 60 provided at one end of lever 61 pivoted at a stationary pin 62. A pin 63 provided on the other end of the lever 61 is connected to a solenoid 64 actuatable when the endoscope is operated for the photographing of the object. A spring 65 normally urges the lever 61 in the retracted position from the solenoid 64. Stopper pin 66 serves to keep the position of the pin 60 so that the blades 58, 59 can be adjusted by the adjusting means described below.

A diagonally oriented elongated slot 67 is provided in the blade 58 while oppositely inclined diagonally oriented elongated slot 68 is provided in the blade 59 with the slot 67 being located to cross the slot 68. A pin 69 fixed to one arm of a swingable lever 70 slidably engages in slots 67, 68. The lever 70 is pivoted on stationary pin 71 while the other arm of the swingable lever 70 contacts with a cam 72 secured to the shaft 51 of the adjusting means. Contact arm 53 and arcuate resistor 55 with lead wires 56, 57 are provided in like manner shown in FIG. 7. A spring 73 serves to urge the above described other arm of the swingable lever 70 to positively contact with the cam 72.

The two blades 58, 59 adjustably define an aperture therebetween in the optical path between the light source and the rearward end of the light conducting fiber optical system so that the intensity of the light passing therethrough is adjusted for the better observation. The aperture is controlled by rotating the shaft 51, because the lever 70 is swung by the cooperation of the cam 72 and the above described other arm of the lever 72 so that the pin 67 on the above described one arm of the lever 70 slides in the oppositely inclined slots 67, 68 in the respective blades 58, 59 thereby permitting the blades 58, 59 to be oppositely swung so as to adjust the aperture. When the endoscope is operated for the photographing of the object, the solenoid 64 is actuated to swing the lever 61 against the action of the spring 65 thereby urging the pivot pin 60 supporting the blades 58, 59 to move toward the pin 67 thereby permitting the blades 58, 59 to be swung out of the optical path so that the intense light is supplied to the light conducting fiber optical system for the photographing of the object.

What is claimed is:

1. Device for determining the distance between an object having substantially the same reflecting power over the entire area thereof and the forward end portion of an endoscope adapted to be inserted into a hollow portion of a living body or the like and through which the object is photographed, said endoscope comprising a control housing connected to said forward end portion through an elongated flexible tube, the illumination of the object for the photographing thereof being effected by an illuminating means suitable for the exposure of the film contained in the forward end portion of the endoscope and having such photosensitive characteristics that the film is not sensitive over a certain range of the wave lengths of the light, wherein the improvement comprises, in combination, another illuminating means provided in said forward end portion and adapted to emit a light of a predetermined constant intensity and having a range of the wave lengths to which said film is not sensitive, a light receiving photoelectric element provided adjacent to said another illuminating means and adapted to be energized by the light emitted therefrom and received by said photoelectric element after it is reflected from the object so as to generate an electrical signal corresponding to the intensity of said light received by said photoelectric element, and means connected to said photoelectric element for indicating and/or recording said electrical signal, thereby permitting the distance between the object and the forward end portion of the endoscope to be determined by said indicated and/or recorded electrical signal while the film is not affected by the light emitted from said another illuminating means and reflected from the object.

2. Device according to claim 1, wherein the film is of the tungesten type and said another illuminating means is is comprised of a luminous diode made of an arsenic-gallium compound.

3. Device according to claim 1, wherein a D.C. amplifier is interposed between said photoelectric element and said means for indicating and/or recording said electrical signal.

4. Device for determining the distance between an object having substantially the same reflecting power over the entire area thereof and the forward end portion of an endoscope adapted to be inserted into a hollow portion of a living body or the like and through which the object is photgraphed, said endoscope comprising a control housing connected to said forward end portion through an elongated flexible tube, wherein the improvement comprises, in combination, an illuminating means adapted to emit a light having a predetermined constant intensity so as to illuminate the object for the photographing thereof, a light receiving photoelectric element adapted to receive the light reflected from the object so as to generate an electrical signal corresponding to the intensity of the light received thereby, means connected to said photoelectric element for automatically determining the proper exposure time in response to said electrical signal and issuing a timing signal, means connected to said means for determining the proper exposure time and said illuminating means for deenergizing said illuminating means in response to said timing signal after the proper exposure time has elapsed, means connected to said means for deenergizing said illuminating means for detecting said proper exposure time, and means for recording the thus detected proper exposure time, thereby permitting the distance between the object and the forward end portion of the endoscope to be determined on the basis of the thus recorded proper exposure time which is the function of said electrical signal, said device further comprising a D.C. amplifier interposed between said photoelectric element and said means for determining the proper exposure time, means connected to said amplifier for indicating the output thereof and provided with a calibration chart indicating the relationship between the proper exposure time and the distance between the object and the forward end portion of the endoscope, so that said indicated output of said amplifier is compared with said calibration chart so as to determine the distance to be sought.

5. Device for determining the distance between an object having substantially the same reflecting power over the entire area thereof and the forward end portion of an endoscope adapted to be inserted into a hollow portion of a living body or the like and from which an image of the object formed by means of an objective lens system is transmitted through an image transmitting optical system such as a fiber optical system extending from said forward end portion through an elongated flexible tube to a control housing connected to said forward end portion through said elongated flexible tube so as to be viewed through an ocular means provided in said housing, wherein the improvement comprises, in combination, an illuminating means adapted to emit a light of a predetermined intensity so as to illuminate the object, a light receiving photoelectric element provided in the endoscope for receiving the light issuing from said illuminating means and reflected from the object so as to generate an electrical signal corresponding to the intensity of said light received by said photoelectric element, means connected to said photoelectric element, means connected to said photoelectric element for indicating and/or recording said electrical signal, thereby permitting the distance between the object and the forward end portion of the endoscope to be determined on the basis of said indicated and/or recorded electrical signal which is the function of the intensity of the light emitted from said illuminating means and received by said photoelectric element after it is reflected from the object, said device further comprising means for adjusting the intensity of the light emitted from said illuminating means for making the intensity of light suitable for the viewing of the object, and means operatively connected to said adjusting means and said indicating and/or recording means for varying the electrical signal in inverse proportion to the variation in the intensity of the light effected by said adjusting means so as to compensate therefor, thereby permitting the distance between the object and the forward end portion of the endoscope to be correctly determined despite the intensity of the light received by said photoelectric element being varied by the adjustment of the intensity of the light illuminating the object by means of said adjusting means.

6. Device according to claim 5, wherein said device comprises means in said forward end portion of the endoscope for photographing the object, and means being provided for switching said adjusting means so as to emit the intensive light for the photographing of the object from said illuminating means each time said device is operated for the photographing of the object while the intensity of the light is normally kept adjustable for the proper viewing of the object.

7. Device according to claim 5 wherein said adjusting means comprises a pair of relatively shiftable blades operatively coupled with said adjusting means and located in the path of the light emitted from said illuminating means and each provided with the corresponding row of a plurality of elongated slits of the same size extending substantially normal to the direction of the row so that, by shifting one of said blades relatively to the other by the operation of said adjusting means, the positions of said elongated slits in one of the blades relative to those in the other are varied so as to adjust the intensity of the light passing therethrough, and said switching means comprises a rotary solenoid carrying said blades which is energized each time the device is operated for the photographing of the object so as to move said blades out of the path of the light emitted from said illuminating means.

8. Device according to claim 5 wherein said adjusting means comprises a pair of oppositely swingable blades located in the path of the light emitted from said illuminating means for adjusting the intensity of the light passing between said blades and pivotably mounted on one end of a first lever which is moved by means of a solenoid energizable by the operation of the device for the photographing of the object, each of said blades being provided with a diagonally extending elongated slot oppositely inclined to each other, a pin fixed to one end of a second lever adjustable by the operation of said adjusting means being slidably engaged in said diagonally extending slot in each of said blades thereby permitting the intensity of the light passing through between said blades to be adjusted for the proper illumination of the object for the viewing thereof by actuating said adjusting means while the intensive light from said illuminating means is permitted to pass between said blades without being interrupted thereby when the device is operated for the photographing of the object by the energization of said solenoid so as to move the pivoted ends of said blades so that said blades are moved out of the path of the light emitted from said illuminating means.

9. Device according to claim 5, wherein said light receiving photoelectric element is located adjacent to said illuminating means.

10. Device for determining the distance between an object having substantially the same reflecting power over the entire area thereof and the forward end portion of an endoscope adapted to be inserted into a hollow portion of a living body or the like and from which an image of the object formed therein by means of an objective lens system is transmitted through an image transmitting optical system such as a fiber optical system extending from said forward end portion through an elongated flexible tube to a control housing connected to said forward end portion through an ocular means provided in said housing, wherein the improvement comprises, in combination, an illuminating means adapted to emit a light of a predetermined intensity so as to illuminate the object, a light receiving photoelectric element provided in the endoscope for receiving the light issuing from said illuminating means and reflected from the object so as to generate an electrical signal corresponding to the intensity of said light received by said photoelectric element, means connected to said photoelectric element for indicating and/or recording said electrical signal, thereby permitting the distance between the object and the forward end portion of the endoscope to be determined on the basis of said indicated and/or recorded electrical signal which is the function of the intensity of the light emitted from said illuminating means and received by said photoelectric element after it is reflected from the object, said device further comprising means for adjusting the intensity of the light emitted from said illuminating means for making the intensity of light suitable for the viewing of the object, and means operatively connected to said adjusting means and said indicating and/or recording means for varying the electrical signal in inverse proportion to the variation in the intensity of the light effected by said adjusting means so as to compensate therefor, thereby permitting the distance between the object and the forward end portion of the endoscope to be correctly determined despite the intensity of the light received by said photoelectric element being varied by the adjustment of the intensity of the light illuminating the object by means of said adjusting means, said illuminating means comprising a light conducting fiber optical system extending through said elongated flexible tube with the forward end thereof being positioned in said forward end portion of the endoscope so as to illuminate the object and with the rearward end thereof terminating at a position adjacent to or in said control housing so that the rearward end of said light conducting fiber optical system is illuminated by an external light source to thereby transmit the light conducting fiber optical system to the forward end thereof so as to be emitted therefrom.

* * * * *